(12) United States Patent
Arntzen

(10) Patent No.: US 10,235,793 B2
(45) Date of Patent: Mar. 19, 2019

(54) GRAPHICS PROCESSING SYSTEMS

(71) Applicant: ARM Limited, Cambridge (GB)

(72) Inventor: Hans-Kristian Arntzen, Trondheim (NO)

(73) Assignee: Arm Limited, Cambridge (GB)

( * ) Notice: Subject to any disclaimer, the term of this patent is extended or adjusted under 35 U.S.C. 154(b) by 90 days.

(21) Appl. No.: 15/443,021

(22) Filed: Feb. 27, 2017

(65) Prior Publication Data

US 2017/0262954 A1  Sep. 14, 2017

(30) Foreign Application Priority Data

Mar. 8, 2016  (GB) .................................. 1604005.7

(51) Int. Cl.
*G06T 15/00* (2011.01)
(52) U.S. Cl.
CPC .................................. *G06T 15/005* (2013.01)
(58) Field of Classification Search
None
See application file for complete search history.

(56) References Cited

U.S. PATENT DOCUMENTS

2013/0169635 A1   7/2013   Carroll
2017/0178401 A1*  6/2017   Agrawal ................. G06T 17/10

OTHER PUBLICATIONS

Combined Search and Examination Report dated Sep. 9, 2016, GB Patent Application No. GB1604005.7.

* cited by examiner

*Primary Examiner* — Nicholas R Wilson
(74) *Attorney, Agent, or Firm* — Vierra Magen Marcus LLP

(57) ABSTRACT

An input set of indices, which contains primitive restarts, is input into splitter stage, where it is split into blocks of index positions. Each of these blocks is processed by scanner stages and scan combiner stage, to determine for each index position, the index position of the end of the sequence of primitives in the set of indices that the index position is part of. The determined index positions of the ends of the sequences of primitives in the set of indices for the index positions are then used to determine for each index position, whether a triangular primitive should be output or not, at a triangle output decision stage. A parallel scan stage then determines each triangle's position in the output set of indices, and the triangle's vertex indices are then written out at index write-out stage to an output set of indices, which contains no primitive restarts.

18 Claims, 9 Drawing Sheets

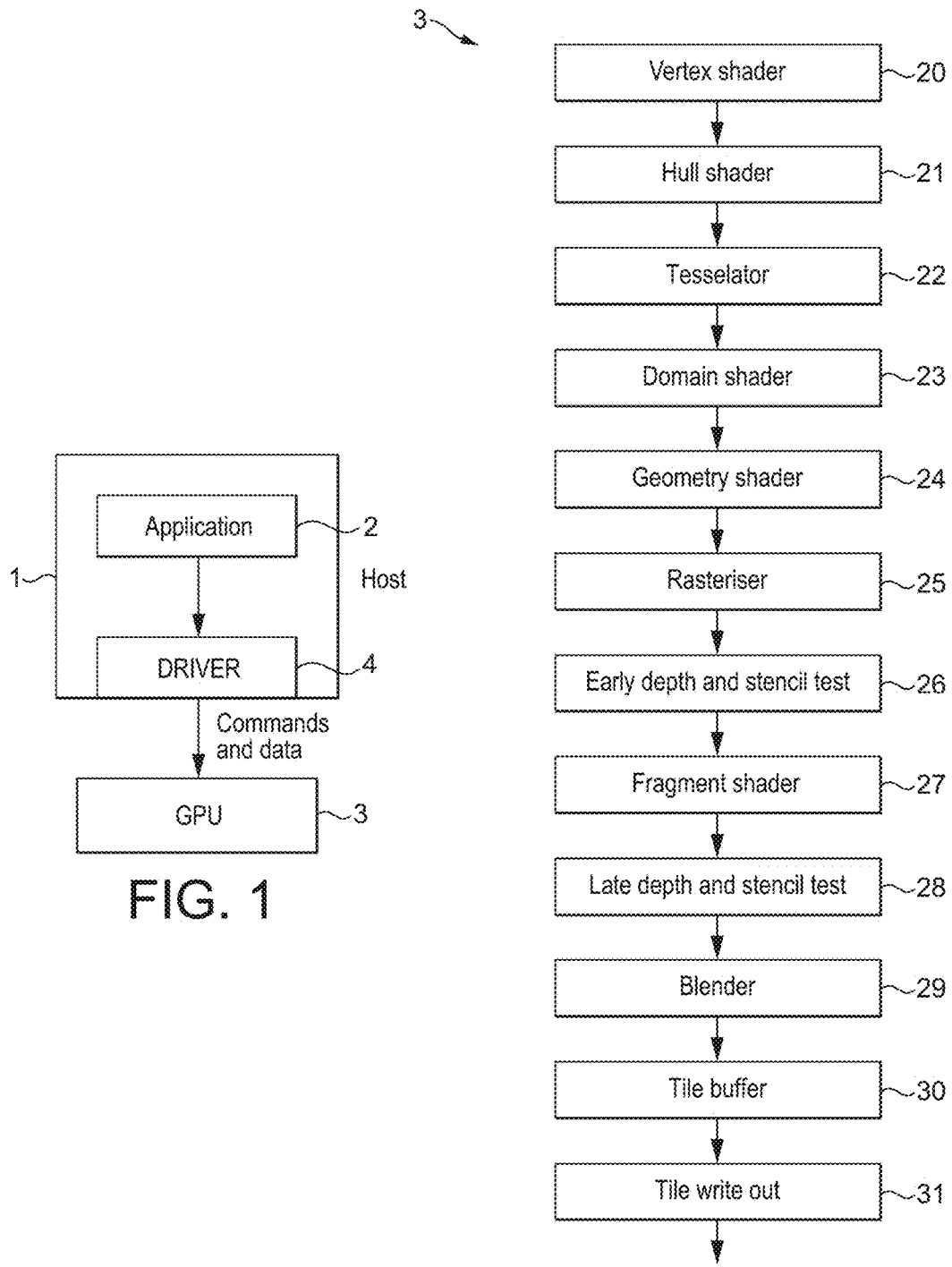

GRAPHICS PROCESSING SYSTEMS

BACKGROUND

The technology described herein relates to graphics processing systems and in particular to methods of and apparatus for identifying primitives and vertices to be rendered when rendering an output in a graphics processing system.

Computer graphics systems typically produce their output, such as frames for display, by processing so-called primitives, which are usually simple polygons such as triangles. Each primitive is normally defined by a set of vertices (e.g. 3 vertices in the case of a triangular primitive).

Typically the set of vertices to be used for a given graphics processing output (e.g. frame for display, draw call, etc.) will be stored as a set of vertex data defining the vertices (e.g. the relevant attributes for each of the vertices). A set of vertex data defining the vertices to be used for generating a given graphics processing output is typically referred to as a vertex buffer or vertex buffer stream.

While it would be possible simply to store the vertices to be used for each primitive to be generated in turn in the vertex buffer (such that, in effect, the list of vertices in the vertex buffer will correspondingly define the primitives to be processed), it is also known to define the primitives separately, in terms of a set of indices that reference the vertices in the set of vertex data. This can then avoid, e.g., the need to duplicate vertices in the set of vertex data (in the vertex buffer), as a single vertex entry in the vertex buffer can be referred to multiple times by reusing the relevant index in the set of indices.

In this case therefore the set of primitives to be processed for a given graphics processing output will be defined by a set of indices (an index buffer stream) that indicates the corresponding vertices in a set of vertex data (in a vertex buffer stream) that are to be used for the primitives in question. Again, the set of indices that refer to the vertices and define the primitives to be processed is typically referred to as an index buffer or an index buffer stream.

For example, for a set of vertices (a vertex buffer stream) V:

V=(A, B, C, D), a set of indices (an index buffer stream) I:

I=(0, 1, 2, 3, 2, 1)

can be used to create the following set (in this case a pair) of triangular primitives P from the set of vertices (vertex buffer stream) V:

P=((A, B, C) (D, C, B))

In this example, the set of indices specifies each vertex to be used explicitly. However, it is also known to use more compact index representations in the set of indices for defining primitives to be processed. For example, a set of indices may define a triangle strip, in which the last two indices of the previous primitive are used for the next primitive. This then means that only one extra index is required to create a new (adjacent) triangular primitive. In these arrangements, the winding order of the primitives is typically also defined to change for each new primitive (e.g. such that if the current primitive count (or position) in the set of indices is odd, then the order of the first two indices in the primitive are swapped).

For example:
for
V=(A, B, C, D, E, F) and
I=(0, 1, 2, 3, 4, 5),
then
P=((A, B, C) (C, B, D) (C, D, E) (E, D, F))

With this scheme, since two out of every three indices are shared, a factor of three compaction for the set of indices can be achieved.

Corresponding arrangements are known and used for other primitive "types", such as triangle fans, line strips, line loops, etc.

It is also known to include in a set of indices defining a set of primitives to be processed, one or more "primitive restarts". A primitive restart is a position in the set of indices after which a new sequence of primitives, for example for a new triangle strip, is started. The next index (position) after a primitive restart is the start of a new primitive (irrespective of how the preceding sequence of indices in the set divides into primitives).

A primitive restart may be indicated, e.g., by way of a particular, optionally predefined, index value in the set of indices, that is to be interpreted as indicating that the next index position in the set of indices starts a new primitive.

The primitive restart feature allows a set of indices to be divided (at any desired point) into different sequences of primitives, e.g. where vertices between a pair of consecutive primitives in the set of indices are not shared. This is a useful technique for, e.g. combining multiple independent triangle strips together.

However, while the use of primitive restarts in a set of indices can be useful, it can lead to difficulties when using the set of indices to identify and generate primitives to be processed. For example, certain graphics processing operations may require "complete" primitives as their input.

However, as primitive restarts (when used) can occur anywhere in an input set of indices, the use of primitive restarts can make the identification of complete primitives in a set of indices that contains primitive restarts more difficult. For example, it may be necessary to analyse each primitive in the set of indices before a "current" primitive that is being considered, in order to be able to identify the correct set of vertices for the "complete" current primitive.

The Applicants accordingly believe that improved methods for handling sets of indices that may contain primitive restarts in graphics processing systems would be desirable.

BRIEF DESCRIPTION OF THE DRAWINGS

A number of embodiments of the technology described herein will now be described by way of example only and with reference to the accompanying drawings, in which:

FIG. 1 shows an example computer graphics processing system;

FIG. 2 shows schematically an example graphics processing pipeline;

DETAILED DESCRIPTION

Figure 3:
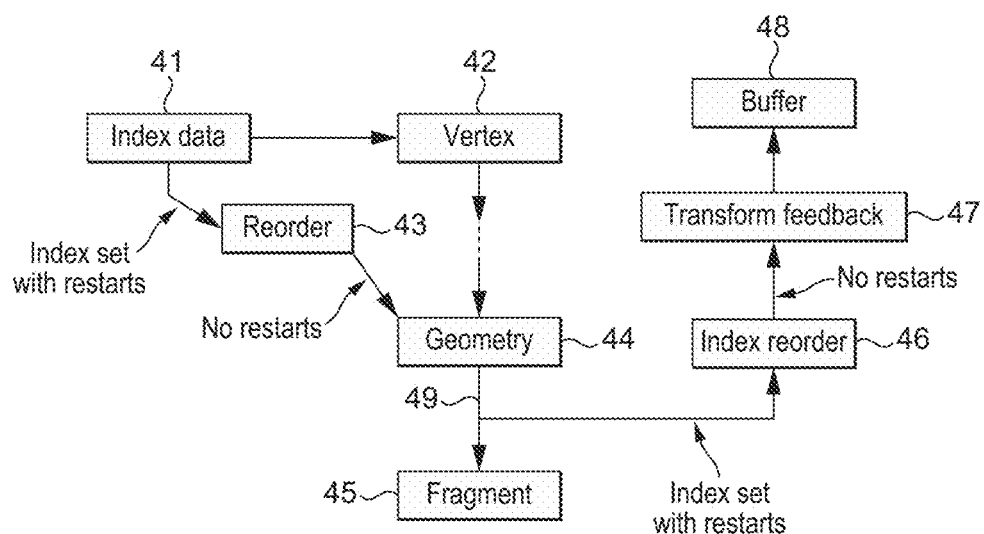
FIG. 3 shows the operation of an embodiment of the technology described herein.

An embodiment of the technology described herein comprises a method of processing a set of indices in a graphics processing system, the set of indices comprising a sequence of indices indexing a set of vertices to identify vertices to be used to form graphics primitives to be processed, and containing at least one primitive restart, each index in the set of indices having a respective index position in the set of indices;

the method comprising, for each index position in the set of indices:

determining the index position of the end of the sequence of primitives in the set of indices that the index position is part of; and using the determined index position of the end of the sequence of primitives in the set of indices that the index position is part of to determine whether the index position corresponds to the start of a complete primitive in the set of indices.

Another embodiment of the technology described herein comprises an apparatus for processing a set of indices in a graphics processing system, the apparatus comprising processing circuitry operable to, for each index position in a set of indices that comprises a sequence of indices indexing a set of vertices to identify vertices to be used to form graphics primitives to be processed, and contains at least one primitive restart, each index in the set of indices having a respective index position in the set of indices:

determine the index position of the end of the sequence of primitives in the set of indices that the index position is part of; and use the determined index position of the end of the sequence of primitives in the set of indices that the index position is part of to determine whether the index position corresponds to the start of a complete primitive in the set of indices.

The technology described herein processes a set of indices of a graphics processing system that contains primitive restarts to determine for each index position in the set of indices, whether that position corresponds to, or could correspond to, the start of a complete primitive in the set of indices. This is done by determining the index position of the end of the sequence of primitives in the set of indices that the index position is part of, and then using that determined index position of the end of the sequence of primitives in the set of indices that the index position is part of to determine if the index position in question corresponds to, or could correspond to, the start of a complete primitive or not.

For example, in the case of triangular primitives, which require three indices in order for their vertices to be defined, if the end of the sequence of primitives in the set of indices that the index position in question is part of is only one index position away, then the index position in question may not correspond to the start of a complete triangular primitive as there may not be sufficient indices before the end of the sequence of indices in the set of indices that the index position is part of to define a complete triangular primitive.

As will be discussed further below, this method provides an efficient mechanism for identifying complete primitives in a set of indices that contains primitive restarts. Moreover, and again as will be discussed further below, the technology described herein facilitates performing this operation in a parallel manner on the set of indices (e.g., for plural index positions in parallel), thereby providing a technique that can be implemented in a (relatively) highly efficient manner.

Furthermore, and as will be discussed further below, the technology described herein can be used to convert a set of indices comprising primitive restarts into a new, equivalent set of indices which contains only complete primitives, with no primitive restarts, in a more efficient manner. Thus embodiments of the technology described herein can provide an efficient method of reordering a set of indices to eliminate any primitive restarts.

The newly created set of indices can then be used, again as will be discussed further below, to allow graphics processing operations, such as geometry shading, that need complete primitives to operate on, to process the primitives defined by the original set of indices in a more efficient, and in particular, in a parallel, manner, since as the new set of indices contains only complete primitives, that set can, for example, be randomly accessed by a geometry shader for the purposes of geometry shading the primitives.

The index position of the end of the sequence of primitives in the set of indices that an index position is part of can be determined in any suitable and desired manner. In an embodiment, this index position is determined as being the index position of the first primitive restart in the set of indices at or after the index position being considered, or as the end index position in the set of indices, where there are no primitive restarts between the index position being considered and the end of the set of indices. Thus in an embodiment, the index position of the first primitive restart in the set of indices at or after the index position being considered, or the end index position in the set of indices, where there are no primitive restarts between the index position being considered and the end of the set of indices, is used to determine whether an index position corresponds to the start of a complete primitive in the set of indices.

The index position of the end of the sequence of primitives in the set of indices that the index position is part of is in an embodiment determined by scanning over the index position being considered and each position in the set of indices after the index position in question and testing the index at that position to see whether it corresponds to a primitive restart or not. If the index corresponds to a primitive restart, then the position being tested is in an embodiment assigned a value corresponding to its position in the set of indices. If the index does not correspond to a primitive restart, then the position being tested is in an embodiment assigned a value corresponding to the end position of the set of indices (i.e. to the number of indices in the set of indices). The assigned values of the index position being considered and of each index position after the index position in question may then be scanned to find the minimum value, which will be index position of the end of the sequence of primitives in the set of indices that the index position is part of.

In an embodiment, a function E(n) corresponding to the end index position for the sequence of primitives that an index position n belongs to is defined, where:

$$E(n) = \min(I_{end}(n), I_{end}(n+1), \ldots) \quad (2)$$

and $$I_{end}(n) = n \text{ if } I(n) = I_{restart} \text{ else } I_{size} \quad (3)$$

Where:

$I_{restart}$ is an index in the set of indices which corresponds to a primitive restart (for example, it may have a predefined value corresponding to a primitive restart), and $I_{size}$ is the size of the set of indices, i.e. the number of indices in the set of indices.

In an embodiment, the index position of the start of the sequence of primitives in the set of indices that the index position is part of (belongs to) is also determined for an index position in the set of indices, and in an embodiment for plural index positions in the set of indices, and in an embodiment for each index position in the set of indices.

This can be done in any suitable and desired manner, but in an embodiment is determined as being the next index position immediately after the last primitive restart before the index position being considered, or the start of the set of indices where there isn't a primitive restart between the start of the set of indices and the index position being considered.

The determined last primitive restart position before the index position may then (also) be (and in an embodiment is) used to determine (when determining) whether the index position in question corresponds to (or could correspond to) the start of a complete primitive in the set of indices.

The index position of the start of the sequence of primitives in the set of indices that an index position is part of is in an embodiment determined by scanning over the index position in question and each position in the set of indices before the index position in question and testing the index at that position to see whether it is a primitive restart or not.

If the index corresponds to a primitive restart, then the position being tested is in an embodiment assigned a value one greater than its position in the set of indices. (The assigned value is one greater than its position in the set of indices because that will then correspond to the position after the primitive restart, i.e. the start position of the next primitive sequence following that primitive restart.) If the index does not correspond to a primitive restart, then the position being tested is in an embodiment assigned the value of the start index position for the set of indices (which will normally be index position "0").

The assigned values of the index position being considered and of each index position before the index position in question may then be scanned to find the maximum value, which will be index position of the start of the sequence of primitives in the set of indices that the index position being considered is part of.

In an embodiment, a function S(n) corresponding to the start index position for the sequence of primitives that an index position n belongs to is defined, where:

$$S(n) = \max(I_{start}(0), I_{start}(1), \ldots, I_{start}(n)) \quad (4)$$

and $$I_{start}(n) = n+1 \text{ if } I(n) = I_{restart} \text{ else } 0 \quad (5)$$

Thus, in an embodiment, the end and start index positions of the sequence of primitives that an index position n falls within are determined. This information is in an embodiment then stored, e.g. in a lookup table, e.g. for use in future processing.

Once the end sequence of primitives index position (and, if desired, the start sequence of primitives index position) has been determined for an index position in the sequence of primitives, that value or values can then be, and is in an embodiment, used to determine whether that index position corresponds to the start of a complete primitive in the set of indices or not.

This can be done in any suitable and desired manner. In an embodiment, the index position being considered is treated as if it is the first index in a "candidate" primitive in the set of indices which will comprise a set of consecutive following indices in the set of indices, with the number of indices in the set being equal to the number of vertices required to define the particular primitive type in question (e.g. three for a triangle). It is then in an embodiment determined whether any of the index positions in the set for a "candidate" primitive correspond to a primitive restart or not.

Thus, for a position n in a set of indices I, a candidate primitive P(n) is in an embodiment defined as:

$$P(n) = (I(n), I(n+1), \ldots, I(n+N-1)) \quad (1)$$

where N denotes the primitive size (e.g. for a triangular primitive, N would be three). In an embodiment, this "candidate" primitive is not written out/stored as a real primitive if any of the index positions in the candidate primitive are primitive restarts.

Thus, in an embodiment each index position in a candidate primitive is tested to see whether it corresponds to a primitive restart, and if one or more index positions in the candidate primitive correspond to a primitive restart, then the candidate primitive is determined to not be a real primitive (i.e. the index position being considered is not the start of a complete primitive).

In an embodiment, one or more other criteria are also or instead used to determine if a "candidate" primitive should be written out/stored as a real primitive or not.

For example, and in an embodiment, it may additionally or alternatively be tested how many index positions there are between the index position (corresponding to the start of the "candidate" primitive) being considered and the next primitive restart, and checked to see whether this corresponds to sufficient index positions (e.g. three, for a triangle) to constitute the definition of a complete primitive.

Thus, for example, for triangle strips, a "candidate" primitive is written out/stored as a real primitive for each index position if none of the index positions in the candidate primitive are primitive restarts, whereas for triangle lists, only every third non-restart index position is (potentially) able to create a new primitive.

Further requirements may also need to be met in order for a "candidate" primitive to be determined to be a real primitive (i.e. for an index position to be considered to be the start of a complete primitive in the set of indices), e.g., and in an embodiment, depending on the primitive type being tested for.

For example, for certain primitive types at least, it may also be desirable to use the index position for the start of the sequence of primitives that the index position being considered (i.e. that starts the "candidate primitive") belongs to. Thus, in an embodiment, it is determined whether an index position corresponds to the start of a complete primitive using both the determined index position of the end of the sequence of primitives that the index position belongs to, and the determined index position of the beginning of the sequence of primitives that the index position being considered belongs to.

The functions E(n) and/or S(n) defined above may be used in this/these test(s).

For example, in the case of a triangle strip, a candidate primitive P(n), starting at index position n, is in an embodiment determined to be a real primitive if and only if:

$$n+3 \leq E(n)$$

Similar rules are in an embodiment used for testing other primitive types, as shown in Table 1:

TABLE 1

Example rules for when an index position n starts a
complete primitive for OpenGL primitive types

| | |
|---|---|
| TRIANGLE_STRIP | n + 3 ≤ E(n) |
| TRIANGLE_FAN | n + 3 ≤ E(n) |
| TRIANGLE_LIST | n + 3 ≤ E(n) and n − S(n) mod 3 = 0 |
| TRIANGLE_LIST_ADJACENCY | n + 6 ≤ E(n) and n − S(n) mod 6 = 0 |
| TRIANGLE_STRIP_ADJACENCY | n + 6 ≤ E(n) and n − S(n) mod 2 = 0 |
| LINES | n + 2 ≤ E(n) and n − S(n) mod 2 = 0 |
| LINE_STRIP | n + 2 ≤ E(n) |
| LINE_LOOP | n < E(n) and S(n) + 2 ≤ E(n) |
| LINES_ADJACENCY | n + 4 ≤ E(n) and n − S(n) mod 4 = 0 |
| LINE_STRIP_ADJACENCY | n + 4 ≤ E(n) |
| POINTS | n < E(n) |

When an index position in a set of indices is identified as being the start of a complete primitive in the set of indices, then in an embodiment, the complete primitive for that index position (i.e. including all of its indices from the set of indices) is written out to storage, e.g., and in an embodiment, to a (reordered) set of indices that contains (defines) complete primitives, and in an embodiment has no primitive restarts. A complete primitive is in an embodiment stored (written out) as the sequence of its vertex indices from the input set of indices.

In an embodiment, before a candidate primitive which has been determined to be a complete primitive is written out, the winding order for its vertices is determined (e.g. so that the primitive may be (and is in an embodiment) written out (stored) with its vertices (its vertex indices) in the correct order).

Thus, in an embodiment, once it is determined that an index position is the start of a complete primitive, the winding order for that complete primitive is determined.

The winding order for a primitive can be determined in any suitable and desired manner. In an embodiment, this is done using the determined start position in the set of indices for the sequence of primitives that the index position (i.e. the complete primitive in question) belongs to. In an embodiment, the winding order is determined based on the number of indices (index positions) between the determined start position for the sequence of primitives in question before the primitive index position in question and the primitive index position in question. In an embodiment the winding order is determined based on whether this number of index positions is odd or even.

In an embodiment, in order to find the winding order for a primitive, the following expression is tested:

$n - S(n) \bmod 2.$

The winding order is in an embodiment then set depending on the value of this expression. In an embodiment, if this expression is odd, the winding order is swapped relative to the order that the indices have in the input set of indices.

In an embodiment, as well as determining the winding order for a complete primitive that is to be written out for an index position, the output position (i.e. the position in the sequence of primitives that the primitive being written out should have) is in an embodiment also or instead determined (with the identified complete primitive then being written out to that determined output position in the written out sequences of primitive). This then ensures that when a new reordered primitive set of indices is written out, the identified complete primitives from the original set of indices will be written to and placed in the correct positions in the modified set of indices that contains only complete primitives.

Determining the output position for an identified complete primitive in an embodiment comprises summing the number of complete primitives found up to the position of the primitive index in question. Adding up the number of primitives found up to the position of a complete primitive to be output, determines the position (number) of the primitive to be output in the sequence of primitives in question.

The number of primitives before the position of a complete primitive to be output can be determined in any suitable and desired manner.

In an embodiment, a so-called "prefix sum" is performed to add up the number of primitives found up to the position of the primitive index to be output.

The following is an example of a prefix sum (which may be performed, for example, by an exclusive scan), which may be used to obtain a final output position o(n) for a primitive starting at vertex index position n:

$$o(n) = \sum_{i=0}^{n-1} p(n) \qquad (6)$$

where p(n)=1 if P(n) is a primitive (i.e. if index position n is the start of a complete primitive), and 0 otherwise. o(n) will then give the number (position) in the sequence of primitives of a given primitive to be output, by summing the number of primitives to be output up to index position n.

When the final output position o(n) and winding order (which, as explained above, in an embodiment depends on n−S(n) mod 2) is known, the full, reordered primitive may be emitted (written out).

In an embodiment, a total actual primitive count is determined for the set of indices being processed. This is in an embodiment done as each "real" primitive is identified, for example, and in an embodiment, by atomic addition. This can allow, for example, graphics processing operations such as geometry shading jobs, for example, to be set up in parallel with subsequent reorder stages. This can help to reduce the latency of setting up compute shader jobs, for example. In an embodiment this primitive count is also used to increment a "primitives generated" query counter.

The output of the processing of the set of indices in the manner of the technology described herein is, as discussed above, in an embodiment an appropriately ordered version of the set of indices that comprises only complete primitives (and that does not contain any primitive restarts).

Thus, in an embodiment, the method of the technology described herein comprises (and the apparatus of the technology described herein is operable to) receiving (e.g. reading) an input set of indices and writing out (outputting), e.g. to storage, a modified version of the input set of indices that comprises some, and in an embodiment all, of the primitives in the input set of indices but as complete primitives and that does not contain any primitive restarts. This output set of indices will accordingly in an embodiment comprise a list of vertex indices denoting the complete primitives from the input set of indices.

The reordered set of indices that contains only complete primitives can then be, and is in an embodiment then, used for and when processing the primitives that the set of indices denotes. Such processing can comprise any suitable and desired processing that a sequence of primitives may be required to undergo.

The reordered set of indices is in an embodiment used for graphics processing operations that require complete primitives on which to operate, such as when rendering adjacent primitives without geometry shaders (such that adjacent vertices need to be removed and the set of indices needs to be re-packed such that it contains only complete primitives).

In one embodiment, the processed set of indices is used when and for performing geometry shading, i.e. as the input to geometry shading processing (geometry shading stage) of a graphics processing pipeline. The technology described herein is advantageous in this regard, because by providing a set of indices that contains only complete primitives, geometry shading operations can be performed in parallel.

The modified set of indices that is produced by the technology described herein is in an embodiment also or instead for transform feedback operations. Again, the technology described herein is advantageous in this regard, as such transform feedback operations typically require complete primitives to operate on.

It will be appreciated from the above that the operation of the technology described herein will involve a number of determinations in respect of each index position, for example determining the start and end points of the sequence of primitives in the set of indices that an index position is part of, and then whether the index position corresponds to the start of a complete primitive in the set of indices. While these processes could be performed for each index position in the input set of indices separately, the Applicants have recognised that it would be desirable to do this processing for the index positions in the input set of indices in a more efficient manner.

In an embodiment, these processes are performed for plural index positions in parallel. Thus, for example, plural candidate primitives are in an embodiment tested in parallel to determine whether they correspond to complete primitives.

In an embodiment, to determine the index position of the end of the sequence of primitives in the set of indices that an index position is part of for each index position being considered, firstly an $I_{end}$ value is assigned to each index position in accordance with function (3) above, i.e. such that if the index position corresponds to a primitive restart then the index position is assigned a value corresponding to its position in the set of indices, but if the index position does not correspond to a primitive restart then the index position is assigned a value corresponding to the end position of the set of indices. This is in an embodiment done in parallel for plural index positions being considered, and in an embodiment for each index position being considered.

The so-assigned $I_{end}$ values for each index position are in an embodiment then propagated to the other index positions in the sequence of index positions being considered, again in an embodiment in parallel, to determine the value E(n) for each index position. This can be done in any desired and suitable manner, but in an embodiment it is done by performing a prefix scan with a minimum operator (i.e. according to function (2) above) in a direction from the end towards the start of the sequence of index positions being considered.

Correspondingly, in an embodiment, to determine the index position of the start of the sequence of primitives in the set of indices that an index position is part of for each index position being considered, firstly an $I_{start}$ value is assigned to each index position in accordance with function (5) above, i.e. such that if the index position corresponds to a primitive restart then the index position is assigned a value corresponding to its position plus one in the set of indices, but if the index does not correspond to a primitive restart then the index position is assigned a value corresponding to the start position of the set of indices. This is in an embodiment done in parallel for plural index positions being considered, and in an embodiment for each index position being considered.

The so-assigned $I_{start}$ values for each index position are in an embodiment then propagated to the other index positions in the sequence of index positions being considered, again in an embodiment in parallel, to determine the value S(n) for each index position. This can be done in any desired and suitable manner, but in an embodiment it is done by performing a prefix scan with a maximum operator (i.e. according to function (4) above) in a direction from the start towards the end of the sequence of index positions being considered.

Thus, in an embodiment, the primitive sequence end and/or start positions, E(n) and S(n), for each index position are determined in parallel for each index position in the set of indices, in an embodiment by performing a scan (e.g. an inclusive scan) over the "min" and "max" functions (2) and (4), respectively. The start index positions for the index positions, S(n), are in an embodiment computed forwards, i.e. in a direction from the start of the set of indices towards the end of the set of indices. Correspondingly, the end index positions for the index positions, E(n), are in an embodiment computed backwards, i.e. in a direction from the end of the set of indices towards the start of the set of indices.

The propagating of the index position values can be done in any appropriate and desired manner, e.g. using any suitable and desired "scan" operation. It is in an embodiment done by progressively comparing the values for respective pairs of index positions in the set of indices and selecting the value to assign to one of the index positions in the pair using a "min" or "max" function, as appropriate, so as to propagate the appropriate values to all of the index positions being considered.

Thus, for example, in the case of propagating the index position for the end of the sequence of primitives that an index position belongs to, the (currently) assigned $I_{end}$ values for two index positions will be compared, and the minimum of those two values will be assigned to the index position that is closer to the start of the sequence of index positions being considered. This will then have the effect of propagating the minimum $I_{end}$ value for index positions towards the start of the sequence of index positions being considered.

Conversely, for the start index position of a sequence of primitives, the maximum $I_{start}$ value of a pair of index positions being compared will be assigned to the index position that is closer to the end of the sequence of index positions being compared, so as to propagate the maximum $I_{start}$ value in a direction towards the end of the sequence of index positions.

A corresponding scanning process is in an embodiment used when determining the position of an identified complete primitive in the sequence of primitives defined by the set of indices. In this case, in an embodiment, the primitive order is determined by performing a prefix scan operation with an addition operator (i.e. a prefix sum) in a direction that is forwards in the set of indices (i.e. that is in a direction from the start of the set of indices towards the end of the set of indices).

The scanning process for propagating an index position, etc. values can be performed in any appropriate and desired manner.

For example, an "up sweep"/"down sweep" scanning process may be used.

In this arrangement, an "up sweep" scan would first be performed, in which for each consecutive pair of index positions in the set of indices, the initial value of the later index position in the pair of index positions in the direction of propagation of the values is compared to the value for the preceding index position in the propagation direction for the pair of index positions to determine whether it is greater or smaller than the value for the later index position in the propagation direction (e.g. depending upon whether the scan is to propagate the minimum or maximum value, as discussed above), and the value of the earlier index position of the pair of index positions is then assigned or not to the later index position in the propagation direction, depending on the result of the comparison.

Then, in a second step, pairs of the later index positions in the propagation direction from the first set of pairwise comparisons are correspondingly compared, and the appropriate value assigned to the later index position in the propagation direction of the pair being compared (based on the minimum or maximum function that is being propagated, as appropriate).

Then, if required, further steps in which again pairs of the later index positions in the propagation direction of each pair are compared to again assign the appropriate value to the later index position in the propagation direction for the pair being compared, and so on, are performed, until a value has been assigned to the final index position in the sequence of index positions being considered in the propagation direction in question. (The number of steps needed will depend on the number of index positions being considered.)

In this regard, the propagation direction will either be from the start of the sequence of index positions towards the end of the sequence of index positions, or vice-versa, and in an embodiment, as discussed above, depends upon whether it is the start or end primitive sequence index positions that are being propagated.

In the case of the primitive sequence start positions, S(n), for the index positions, the propagation direction will be forwards in the set of indices, in the direction from the start of the set of indices towards the end of the set of indices, and each comparison will determine which of the values being compared is the maximum value and assign that to the later index position in the propagation direction (which in that case will be the index position of the pair that is closer to the end of the set of indices).

Conversely, for the end index position for the sequence of primitives that an index position belongs to, E(n), the propagation direction will be from the end of the set of indices towards the start of the set of indices (such that the later index position in the propagation direction will be the index position that is closer to the start of the set of indices of the pair of index positions being considered), and the comparison will determine the minimum of the two values and assign that minimum value to the later index position in the propagation direction.

Once the "up sweep" scan has been completed, then in an embodiment a corresponding "down sweep" scan is performed in which the results of the up sweep scan are appropriately compared in pairs to propagate the desired values to the index positions in the set of indices that did not have the appropriate final value assigned to them by the "up sweep" scan.

In an embodiment, a scanning process that is not a "simple" "up-sweep" scan and "down-sweep" scan is used to propagate the desired values to the index positions in the set of indices.

In this arrangement again, in a first step the values for respective pairs of index positions in the set of indices are compared so as to propagate the appropriate value to the later index position in the propagation direction in question of each respective pair that is being compared. However, in the next step, instead of simply comparing appropriately pairs of the later index positions in the propagation direction of each pair of index positions that were considered in the first step, the value assigned to the later index position of a pair of index positions that were compared in the first step is compared appropriately with the value of both index positions in the next pair of index positions in the propagation direction. This will then mean that at the end of this second step, each index position of groups of four consecutive index positions (of two pairs of consecutive index positions) will have the appropriate values assigned to them.

A further step of then comparing the value assigned to the final index position in a group of four consecutive index positions in the propagation direction appropriately with the values of the index positions in the next set of four consecutive index positions in the propagation direction, such that those four later index positions will then have the appropriate values assigned to them based not only on their own values but also on the values of the four preceding index positions, is in an embodiment then performed.

This process is in an embodiment continued as necessary for each successively larger set of groupings of index positions until the appropriate values have been propagated to (and assigned to) all the index positions being considered.

This then has the effect of assigning the appropriate values to the index positions in the set of indices without the need for a subsequent "down sweep" pass to propagate the values to any "missing" index positions (unlike in the up sweep and down sweep scanning operation).

It would be possible to perform in this regard, two overall scanning operations, one to propagate the desired values from the end of the set of indices to the beginning of the set of indices, and another to propagate the desired values from the beginning of the set of indices to the end of the set of indices.

However, in an embodiment, these two scanning processes are performed in parallel, i.e. both a forward scan and a backwards scan are performed simultaneously for a given set of index positions being considered. This will then have the effect of propagating the desired values both forwards and backwards in the set of indices in a single scanning operation.

Thus the values for E(n) and S(n) are in an embodiment propagated backwards and forwards along the set of indices in parallel. This process and scan may be referred to as a "butterfly" scan.

While it would be possible to scan the set of indices in one of the above manners as a whole, in an embodiment, the set of indices is divided into two or more blocks of (consecutive) index positions for scanning. Each such block may contain any desired number of index positions, such as 256 index positions. This can then allow the blocks of index positions to be scanned individually, and in parallel, for example using different processing cores, thereby improving processing efficiency. In this case, each block may be considered and treated as a single OpenCL work group, for example.

Thus, in an embodiment, an input set of indices to be processed is divided into two or more smaller blocks of consecutive index positions. In an embodiment, each block has a size $N_{block}$ (where $N_{block}$ is the number of index positions in the blocks). In an embodiment $N_{block}$ is the same for all of the blocks, i.e. the blocks are the same size. (If the input set of indices cannot be divided into equal-sized blocks, the input set of indices may be "padded" (enlarged), e.g. with appropriate dummy values, such as zeroes in case of a prefix sum, so that equal-sized blocks may be provided.)

Where an input set of indices to be processed is divided into two or more blocks of index positions for scanning, then the results of scanning a given block will need to be propagated to the later blocks (in the appropriate propagation direction) of the overall set of indices, so that all of the index positions in the set of indices can take account (appropriately) of all of the values determined for the individual blocks.

To do this, an appropriate "residual" value or values is in an embodiment produced for each block, which is in an embodiment the result of the scan (e.g. S(n), E(n), or the sum (for the prefix sum)) for all of the index positions in the block.

A scan is in an embodiment then performed over all of the "residual" values from the blocks, again in an embodiment with the same block size (with a block size of $N_{block}$).

Once such a block-based scan has been performed and a further scan of all of the residual values (e.g. for S(n) or E(n), or the prefix sum) has also been performed, the results of these scans are in an embodiment combined appropriately to give the final scan value (e.g. for S(n) or E(n), or the prefix sum) for a, and for each, index position.

Thus, in an embodiment, the set of indices is first divided into two or more blocks of index positions. The blocks are then in an embodiment scanned individually, and in parallel, to determine for each index position in the block in question, the appropriate value for E(n) and/or S(n) within the block itself. The values for respective blocks are in an embodiment then propagated to the other blocks appropriately (i.e. either forwards or backwards). This is in an embodiment done by producing a residual value for each block, performing a scan of the residual values from the blocks, and combining the results of the residual values scan and the individual block scans to provide a complete scan of the entire set of indices (and to determine the output values for each index position in the entire set of indices).

In cases where the input set of indices is larger than $N_{block}^2$, then extra passes which recursively scan residuals of residuals, or, alternatively, a loop which adds up (or otherwise compares or determines) all the residual values as necessary, may be, and is in an embodiment, used, to provide a complete scan over all the index positions in the set of indices.

In an embodiment, smaller groupings of consecutive index positions are first scanned and then the values of these smaller groupings of index positions propagated appropriately to other such groupings of the index positions, e.g. in the manner discussed above in relation to dividing the index positions into blocks. In this case, each such smaller grouping of index positions that is initially scanned as a whole in an embodiment comprises a number of index positions that can be processed by a single execution thread, storing its results in registers instead of in shared memory.

Thus, in an embodiment, groups of consecutive index positions are each processed by respective execution threads, and have a size such that that processing can be performed using registers and without the need to store values in shared memory. In this case each such smaller grouping of index positions is in an embodiment based on the number of registers that are available. In an embodiment, each such grouping comprises 8 index positions. Other arrangements would, of course, be possible.

This may significantly reduce the shared memory requirements for the scan operations.

This arrangement is in an embodiment used in combination with subdividing the input set of indices into bigger blocks as discussed above (such that there will then be two levels of subdivision allowing for parallel processing of the index positions: the larger blocks, with each such block then being further divided into plural "mini blocks" each of which are processed by a respective single execution thread using registers).

It will be appreciated from the above, that in an embodiment of the technology described herein the method comprises, and the apparatus is configured to perform, a first scanning pass which operates on blocks of index positions to determine the values for S(n) and E(n) for each index position and also produces a set of residual values, followed by a second scanning pass of the residual values from the first pass, followed by a third scanning pass which combines the outputs from the first and second passes to give the final scan, S(n) and E(n), for each index position. It is in an embodiment also determined in this third pass whether or not each index position is the start of a complete primitive or not. The winding order and/or other information is in an embodiment also determined.

These passes are in an embodiment then followed by a blockwise scan for the primitive count P(n) for each block using a prefix sum. There is then in an embodiment a second pass of the residuals from the first prefix sum pass and finally a pass that combines the outputs from the first and second prefix sum passes to resolve the prefix sum so as to emit the complete primitives in their correct positions to the modified, output set of indices.

The methods and apparatus of the technology described herein can be implemented in any appropriate and desired manner, e.g. in hardware or software (or both), and in (and be included in) any appropriate device or component.

In an embodiment, the processing of the input set of indices to provide the modified output set of indices that contains only complete primitives is performed by the graphics processor, e.g., and in an embodiment, operating as a general purpose GPU (GPGPU) (using GPGPU compute code on the graphics processor). This is in an embodiment done under the control of and triggered by a driver for the graphics processor that is executing, e.g., on a host processor of the overall data processing system that the graphics processor is part of.

The set of indices may be stored in any suitable and desired memory, which memory may be configured in any suitable and desired manner. For example, it may be an on-chip buffer or it may be an external memory. Similarly, it may be dedicated memory for this purpose or it may be part of a memory that is used for other data as well. In an embodiment, this data is stored in main memory of the system that incorporates the graphics processor.

Thus, the apparatus of the technology described herein may comprise one or more or all of: a host processor, a CPU of a host processor, a driver for a graphics processor (GPU) that is to perform the graphics processing operation, and a graphics processor (GPU).

As will be appreciated from the above, the technology described herein is accordingly in an embodiment implemented and executed in a graphics processing system that includes a host processor (CPU) and a graphics processor (GPU), with the host processor executing a driver for the graphics processor.

The graphics processor and/or graphics processing system may also comprise, and/or be in communication with, one or more memories and/or memory devices that store the data described herein, and/or the output data generated by the graphics processing unit, and/or store software for performing the processes described herein. The graphics processing unit may also be in communication with the host microprocessor, and/or with a display for displaying images based on the data generated by the graphics processing unit.

The technology described herein can be used in any suitable and desired graphics processing system. In an embodiment, the graphics processing system is a tile-based graphics processing system (GPU).

The graphics processing system is in an embodiment able to be operated both in a conventional graphics context, e.g. to perform conventional graphics rendering processes, and also in a compute context so as to be able to perform GPGPU processing.

The graphics processor may contain any suitable and desired processing stages (elements) that a graphics processor and processing pipeline may contain such as a vertex shader, geometry shader, rasteriser, a renderer (fragment shader), an early depth (or an early depth and stencil) tester, a late depth (or depth and stencil) tester, a blender, a tile buffer or buffers, a write-out unit, etc.

The graphics processing system in an embodiment includes at least local memory, such as (on-chip) buffer or buffers, and/or register(s), that can be used to store the data required.

The technology described herein can be used for all forms of output that a graphics processing system may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable and/or configured to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics pipeline that is implemented by way of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 in more detail.

The graphics processing pipeline 3 shown in FIG. 2 is a tile-based renderer with a fully programmable GPGPU context, for example a renderer which executes partly via Direct Compute, OpenCL, CUDA, etc.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

As discussed above, computer graphics systems typically produce their output, such as frames for display, by processing so-called primitives, which are usually simple polygons such as triangles. Each primitive is normally defined by a set of vertices (e.g. 3 vertices in the case of a triangular primitive).

Typically the set of vertices to be used for a given graphics processing output (e.g. frame for display, draw call, etc.) will be stored as a set of vertex data (a vertex buffer or vertex buffer stream) defining the vertices (e.g. the relevant attributes for each of the vertices).

The present embodiments relate to arrangements in which the set of primitives to be processed for a given graphics processing output is indicated by a set of indices (an index buffer stream), that indicates the corresponding vertices in a set of vertex data (in a vertex buffer stream) that are to be used for the primitives in question, and in particular to the situation where a set of indices defining a set of primitives to be processed may contain one or more "primitive restarts" (which may be indicated, e.g., by way of a particular index value in the set of indices, that is to be interpreted as indicating that the next index position in the set of indices starts a new primitive).

More specifically, the present embodiments relate in particular to processes for producing from a set of indices that may contain primitive restarts, a reordered (modified) version of the set of indices that contains only complete primitives (and that does not contain any primitive restarts). Embodiments for performing this operation will now be described in more detail with reference to FIGS. 3 to 13.

FIG. 3 shows schematically the processing stages in an embodiment of the technology described herein, and where, in this processing, the generation of the reordered set of indices occurs.

As shown in FIG. 3, an input set of indices 41, which includes input primitive restarts, and which references (indexes) into a vertex buffer 42, is input to an index reordering stage 43.

The index reordering stage 43 performs an index reordering process that is in accordance with the technology described herein to reorder the indices in the set of indices 41 so as to provide a modified version of the input set of indices that no longer contains any primitive restarts.

The reordered set of indices from the index reordering stage 43 is then input into a geometry shader 44. The geometry shader 44 performs geometry shading operations on complete primitives, using the reordered set of indices output from the index reordering stage 43.

The geometry shader 44 produces as its output a set of indices 49 of primitives to be processed. In the present embodiment, it is assumed that this set of indices 49 output by the geometry shader 44 includes primitive restarts. (Geometry shaders can output multiple, distinct primitives, and/or create, e.g. triangle strips or other primitive sequences that contain primitive restarts, as desired.)

The output set of indices 49 from the geometry shader 44 is passed to a fragment processing stage 45 which performs subsequent processing operations on the primitives that have been processed by the geometry shader 44, such as rasterisation and rendering (fragment shading) operations, to generate the final graphics processing output (e.g. output frame). (The fragment processing stage 45 is able to use the output set of indices 49 from the geometry shader 44 that contains primitive restarts.)

The set of indices 49 with primitive restarts that is output from the geometry shader 44 is, in this embodiment, also input into a second index reordering stage 46, for removal of the primitive restarts. This second index rendering stage 46 again performs an index reordering process that is in accordance with the technology described herein to reorder the indices in the set of indices 49 such that that set of indices no longer contains any primitive restarts.

The data output from the second index reordering stage 46 comprises a set of indices with no primitive restarts and is input into a transform feedback stage 47, which requires a set of indices with no restarts on which to operate.

Finally, the data output from the transform feedback stage 47 is written to a buffer 48.

In the present embodiments, the first set of indices reordering stage 43 and the second set of indices reordering stage 46 operate to reorder an input set of indices so as to remove primitive restarts from the input set of indices by determining for each index position in the set of indices, the start and end index positions for the sequence of primitives that the index position in question belongs to. This information is then used to determine for each index position, whether the index position corresponds to the start of a complete primitive or not, and if it does, to then determine the winding order for the primitive that starts at that index position. A prefix sum is also used to determine the position that a complete primitive should have in the reordered set of indices.

More specifically, a function E(n) corresponding to the end index position for the sequence of primitives that an index position n belongs to is defined, where:

$$E(n) = \min(I_{end}(n), I_{end}(n+1), \ldots) \quad (2)$$

and $$I_{end}(n) = n \text{ if } I(n) = I_{restart} \text{ else } I_{size} \quad (3)$$

Where:

$I_{restart}$ is an index in the set of indices which corresponds to a primitive restart (for example, it may have a predefined value corresponding to a primitive restart), and $I_{size}$ is the size of the set of indices, i.e. the number of indices in the set of indices.

Correspondingly, a function S(n) corresponding to the start index position for the sequence of primitives that an index position n belongs to is defined, where:

$$S(n) = \max(I_{start}(0), I_{start}(1), \ldots, I_{start}(n)) \quad (4)$$

and $$I_{start}(n) = n+1 \text{ if } I(n) = I_{restart} \text{ else } 0 \quad (5)$$

As will be discussed further below, a scan is performed over each of the index positions in the set of indices so as to determine the value of E(n) and S(n) for each index position in the input set of indices.

Once E(n) and S(n) have been determined for each index position being considered, one or both of these values is used to determine for each index position whether that index position corresponds to the start of a complete primitive in the input set of indices or not.

This is done in the present embodiments by defining for a position n in a set of indices I, a candidate primitive P(n) as:

$$P(n) = (I(n), I(n+1), \ldots, I(n+N-1)) \quad (1)$$

where N denotes the primitive size (e.g. for a triangular primitive, N would be three).

In the case of a triangle strip, a candidate primitive P(n), starting at index position n, is determined to be a real primitive if and only if:

$$n+3 \leq E(n)$$

Similar rules are used for testing other primitive types, as shown in Table 1:

TABLE 1

Example rules for when an index position n starts a complete primitive for OpenGL primitive types

| | |
|---|---|
| TRIANGLE_STRIP | $n + 3 \leq E(n)$ |
| TRIANGLE_FAN | $n + 3 \leq E(n)$ |
| TRIANGLE_LIST | $n + 3 \leq E(n)$ and $n - S(n) \mod 3 = 0$ |
| TRIANGLE_LIST_ADJACENCY | $n + 6 \leq E(n)$ and $n - S(n) \mod 6 = 0$ |
| TRIANGLE_STRIP_ADJACENCY | $n + 6 \leq E(n)$ and $n - S(n) \mod 2 = 0$ |
| LINES | $n + 2 \leq E(n)$ and $n - S(n) \mod 2 = 0$ |
| LINE_STRIP | $n + 2 \leq E(n)$ |
| LINE_LOOP | $n < E(n)$ and $S(n) + 2 \leq E(n)$ |
| LINE_ADJACENCY | $n + 4 \leq E(n)$ and $n - S(n) \mod 4 = 0$ |
| LINE_STRIP_ADJACENCY | $n + 4 \leq E(n)$ |
| POINTS | $n < E(n)$ |

When an index position in a set of indices is identified as being the start of a complete primitive in the set of indices, then the complete primitive for that index position (i.e. including all of its indices from the set of indices) is written out to the reordered set of indices that contains only complete primitives (and no primitive restarts). Each complete primitive is stored (written out) as the sequence of its vertex indices from the input set of indices.

Before a candidate primitive which has been determined to be a complete primitive is written out, the winding order for its vertices is determined (so that the primitive may be written out (stored) with its vertices (its vertex indices) in the correct order).

To do this, the following expression is tested:

$$n - S(n) \mod 2.$$

The winding order is set depending on the value of this expression.

As well as determining the winding order for a complete primitive that is to be written out for an index position, the output position (i.e. the position in the sequence of primitives that the primitive being written out should have) is also determined, with the identified complete primitive then being written out to that determined output position in the reordered (modified) set of indices.

In the present embodiments, this is done using the following "prefix sum" (which may be performed, for example, by an exclusive scan):

$$o(n) = \sum_{i=0}^{n-1} p(n) \quad (6)$$

where o(n) is the final output position for a primitive starting at vertex index position n, p(n)=1 if P(n) is a primitive (i.e. if index position n is the start of a complete primitive), and 0 otherwise. o(n) thus gives the number (position) in the sequence of primitives of a given primitive to be output, by summing the number of primitives to be output up to index position n.

When the final output position o(n) and winding order (which, as explained above, depends on n−S(n) mod 2) is known, the full, reordered primitive is emitted (written out).

These operations are performed by execution threads executing appropriate compute code on the graphics processor 3.

FIGS. 4 to 8 show embodiments of different scanning methods for propagating the values of S(n) and E(n), for example, to each index position in the set of indices.

Figure 4:
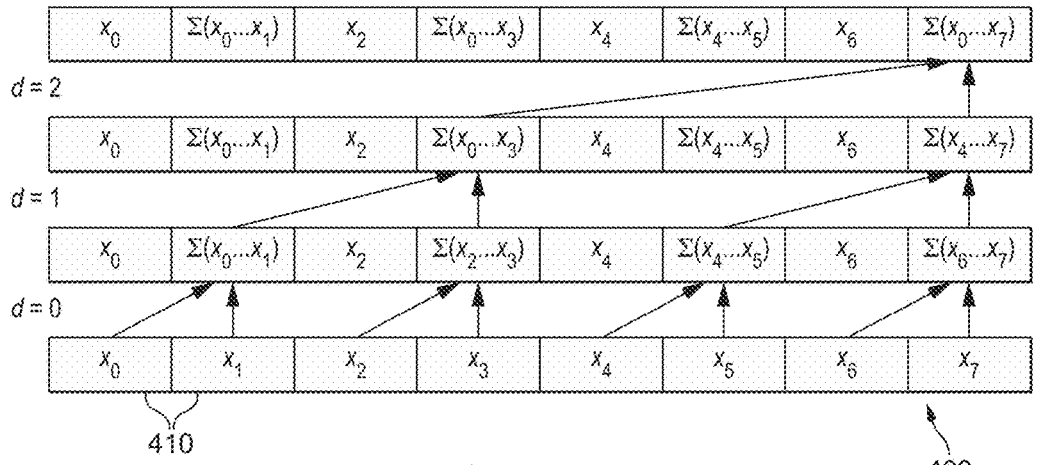
FIGS. 4 and 5 show an embodiment of a scanning operation that is used in an embodiment of the technology described herein.
Figure 5:
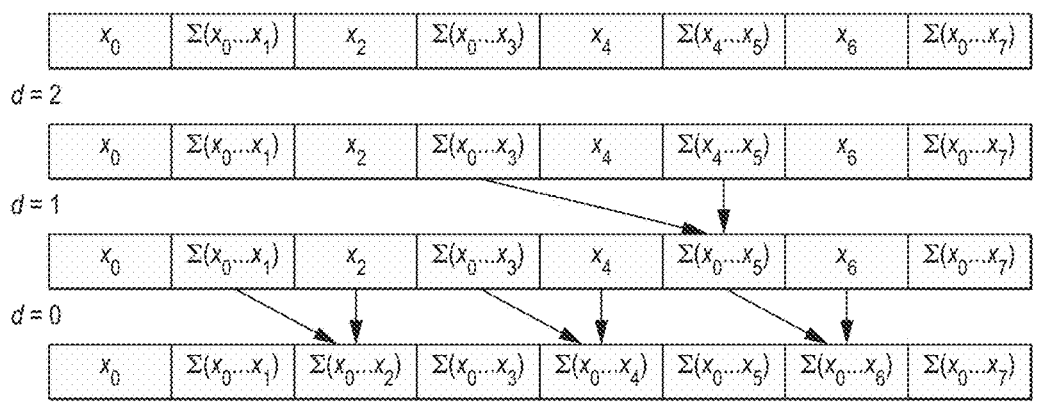

FIGS. 4 and 5 show the use of an "up-sweep" scan followed by a "down-sweep" scan to propagate values to each index position.

FIGS. 4 and 5 show the steps of the scan for propagating a value such as S(n) forwards in the set of indices (i.e. from the start to the end of the set of indices). A corresponding arrangement can be used to propagate values, such as E(n), backwards from the end of the set of indices to the start of the set of indices.

For simplicity, FIGS. 4 and 5 show the process for a set of indices containing 8 index positions $x_0$ to $x_7$. As will be appreciated by those skilled in the art, a typical set of indices will contain many more index positions than 8, but the principles illustrated in FIGS. 4 and 5 (and correspondingly the other Figures) can be applied equally to sets of indices having more index positions appropriately.

FIG. 4 shows an example "up-sweep" (reduction) scan. A set of indices buffer 400 containing indices 410 $x_0$ to $x_7$ is scanned three times (d=0 to d=2). As shown in FIG. 4, in a first step, consecutive pairs of indices 410 are, for example, summed or otherwise compared (e.g. depending on the purpose of the particular scan being performed). In the second step, pairs of these first sums are summed or otherwise compared, and in the third step, the pair of sums or comparison results from the second step are summed or compared, to give a result from all of the index positions for the final index position $x_7$.

However, as can be seen from FIG. 4, following this upstream scan, values have not yet been propagated to the index positions $x_2$, $x_4$ and $x_6$. To do this, a "down-sweep" scan as shown in FIG. 5 is performed.

Thus, as shown in FIG. 5, some of the results of the upsweep scan are progressively summed or compared in pairs in a corresponding manner to the up-sweep scan so as to "fill in" the missing values for the "missing" index positions from the up-sweep scan.

Following this down-sweep scan, as shown in FIG. 5, each index position in the set of indices will contain the appropriate sum or comparison result from the index positions up to that point in the set of indices. Thus, for example, as shown in FIG. 5, index position $x_4$ will be allocated the appropriate value from summing or comparing, as appropriate, the values allocated to the index positions $x_0 \ldots x_4$, and so on.

Figure 6:
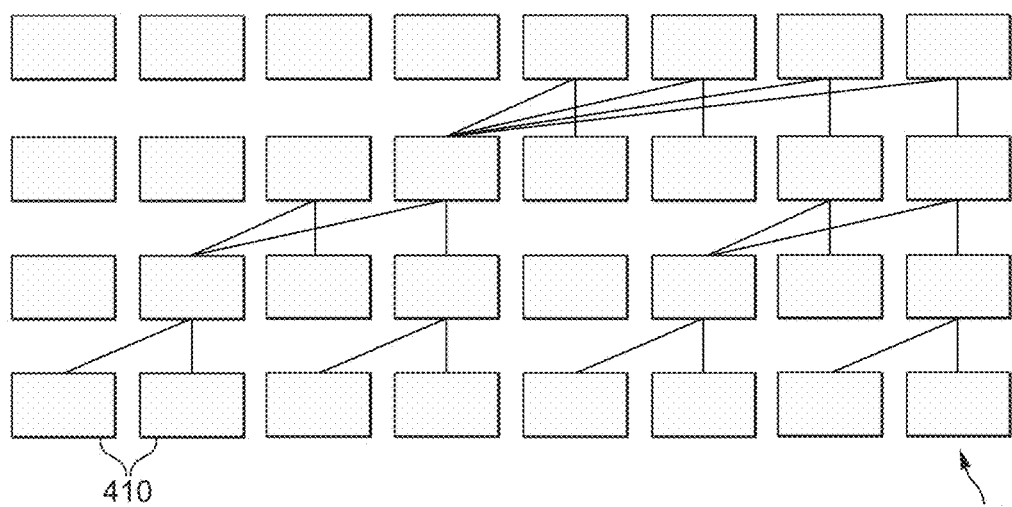
FIGS. 6 and 7 show another embodiment of a scanning operation that is used in an embodiment of the technology described herein.
Figure 7:
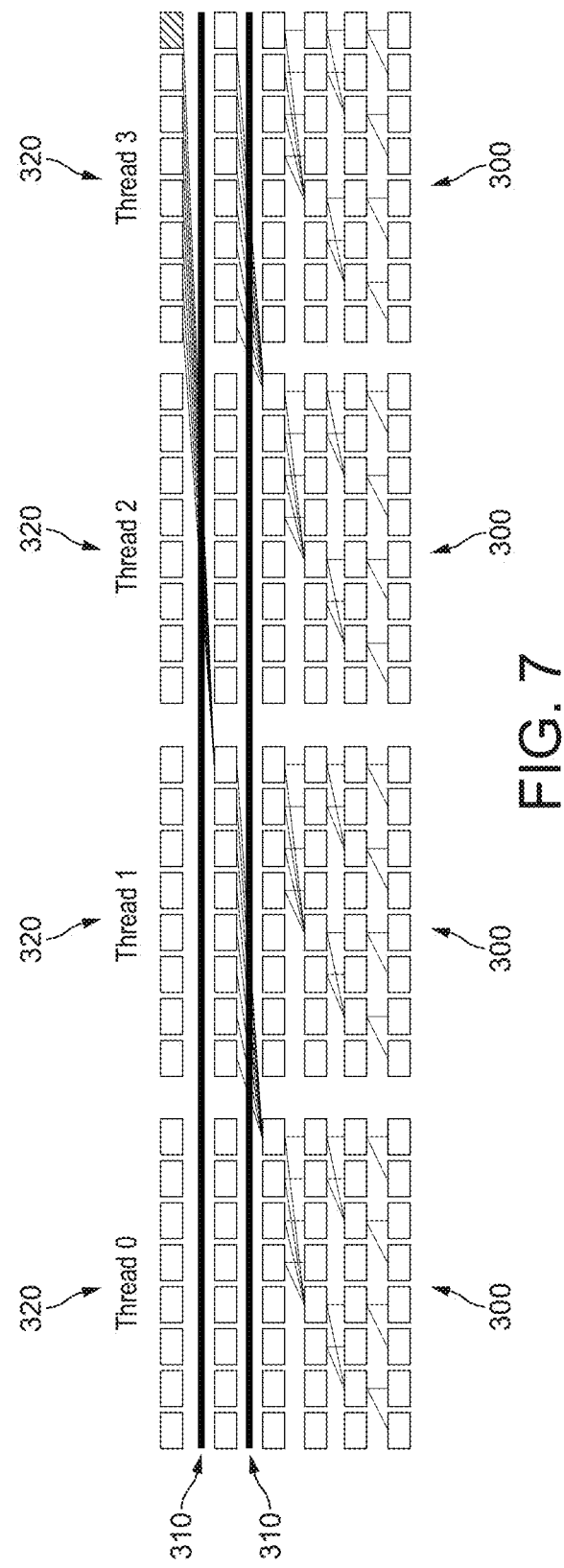

FIGS. 6 and 7 illustrate an alternative embodiment of the scanning process that may be used in embodiments of the technology described herein (and that may provide a more efficient scanning process, at least in certain circumstances).

In this arrangement it is assumed that the index positions in the set of indices are divided into mini blocks 300 comprising consecutive sets of 8 index positions, with each such mini block of index positions being processed by a single execution thread. Sets of plural such index position mini blocks are then organised into index position blocks which may, e.g., be processed as a single work group, with each such block accordingly then being processed in parallel as respective index position blocks.

FIG. 6 shows the scanning operation for a single mini block of 8 consecutive index positions. FIG. 7 shows how the operation will work for a set of four such mini blocks, with each mini block 300 being processed by, as shown in FIG. 7, a respective execution thread 320. The mini blocks are each configured such that the processing within a mini block can be performed using registers to store the values as a mini block is processed, rather than shared memory, which can then reduce the amount of shared memory that is required.

Again, FIGS. 6 and 7, show the process in terms of propagating values from the beginning towards the end of a respective mini block (and the overall set of indices). A corresponding arrangement would be used to propagate values from the end towards the beginning of a respective mini block and the set of indices.

As shown in FIG. 6, in the first part of this processing for a given mini block comprises appropriately combining the values set for respective pairs of index positions. However, the next stage then is to propagate the value from one of the pairs to both index positions of the next higher pair in the sequence of index positions, and so on. This then has the effect that only a single "forward" scan is required to propagate the appropriate values to each index position in a given mini block (rather than having to perform a subsequent "down sweep scan" to propagate the appropriate values to the "missing" index positions).

FIG. 7 shows this operation for the example set of four consecutive mini blocks, each of which are processed by a respective execution thread. As shown in FIG. 4, each mini block 300 will be processed respectively until all the values have been appropriately propagated within the mini block itself. At this point an execution barrier 310 is imposed in the execution flow, to ensure that before any subsequent processing is done, all of the mini blocks have reached this stage.

Then, as shown in FIG. 7, once each mini block's "internal" scan operation has been completed, for each respective consecutive pair of mini blocks, the final value of the last index position in the first mini block of such a pair is propagated to each index position in the subsequent mini block of the pair in a single processing pass. This then has the effect of propagating the appropriate index position values from a preceding mini block to the next mini block.

There is then again another execution barrier 310 to prevent further execution of the scan processing until that pass has been completed. At the end of that processing pass, as shown in FIG. 7, there is then a further processing pass that operates again to propagate the final index position value (the output value) from an earlier mini block to later mini blocks in the sequence, as appropriate.

This process may then be repeated (i.e. setting an execution barrier and propagating mini block values forward to subsequent mini blocks in the manner shown in FIG. 7) as desired, until the values have been propagated across the entire group of mini blocks in question (the block of index positions being processed).

As can be seen from FIG. 7, in this arrangement where values are being propagated forward in the set of indices, once each mini block has had its initial processing performed for it, only half the execution threads may be active in any given pass.

The Applicants have recognised that those idle threads could correspondingly be used to perform a corresponding operation in the backwards direction in the same pass. (As discussed above, in order to find S(n) and E(n) it is necessary to perform scans backwards and forwards along the set of indices.) Thus this arrangement facilitates performing both backwards and forward scans in parallel in each processing pass on each mini block (and so, in an embodiment, this is what is done).

Figure 8:
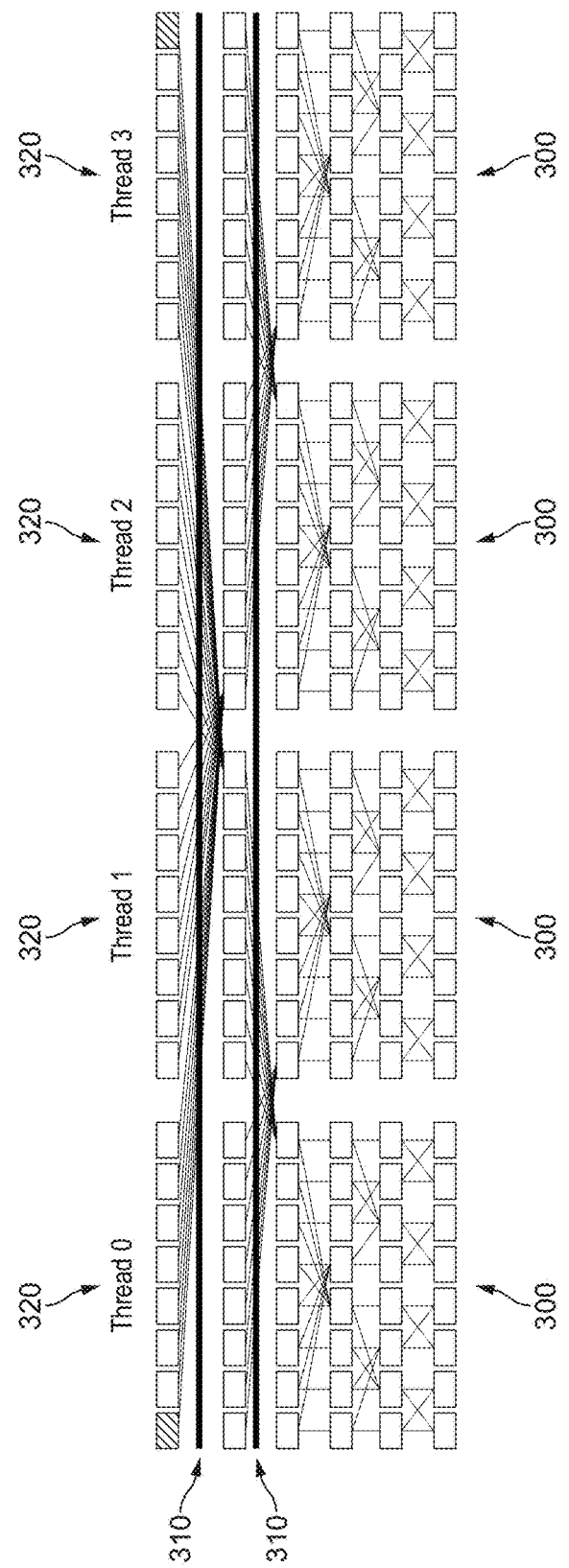
FIG. 8 shows a further embodiment of a scanning operation that is used in an embodiment of the technology described herein.

FIG. 8 shows schematically this operation of performing both forward and backward scans of the appropriate index position values simultaneously. As can be seen from FIG. 8, this then means that all threads can be kept active one at a time, thereby further enhancing the efficiency of the processing. This scanning pattern may be thought of as a "butterfly scan", due to its similarity to the "butterfly" stages in a fast Fourier transform.

In the present embodiments, the above scanning operations are used both to determine the values S(n) and E(n) for each index position in the set of indices being considered, to determine whether each index position corresponds to the start of a real primitive or not, and to determine the position in the primitive sequence of identified complete primitives.

In the present embodiments, this processing is divided into a first set of scans that determine S(n) and E(n) for each index position and whether each index position corresponds to a complete primitive or not, followed by a second set of scans that determines the position to which a complete primitive should be written out in the reordered output set of indices.

An embodiment of this, using the "butterfly" scan arrangement of FIG. 8, comprises six passes as follows:

1. Butterfly scan pass 1: A block-wise butterfly scan for S(n) and E(n), in which every thread works on four S(n) samples, and four E(n) samples, and uses four work registers. With, for example, a workgroup size of 64 threads, $N_{block}$=256. Each workgroup may use, e.g., 512 bytes of shared memory.
2. Butterfly scan pass 2: A block-wise butterfly scan of residual values from first pass, in which every thread works on four S(n) samples, and four E(n) samples, and uses eight work registers. With, for example, a work group size of 64 threads, $N_{block}$=256. Each workgroup may again use, e.g., 512 bytes of shared memory.
3. Butterfly scan pass 3: A pass in which the outputs from pass 1 and pass 2 are combined to find the final scan value for each index position. In the same pass, it is computed whether or not the candidate primitive P(n) for each index position is an actual primitive or not. Winding order and/or other information may also be encoded. Every thread works on four primitives, with a workgroup size of one thread. Thread group split=2 in the driver can be used to avoid inefficiencies with small workgroups. The information for four primitives may be packed into a single 16-bit value. However, a 32-bit value may be used for convenience. The final scan values for S(n) and E(n) are now discarded and not written out to memory.
   In this pass, a primitive count may also be incremented atomically. This primitive count can be used to provide the number of primitives generated.
4. Primitive count scan pass 1: A block-wise scan for p(n), in which each thread works, for example, on eight primitives and uses three work registers (since, in this pass, p(n) can at most be one, it is possible to keep the register count down). With, for example, a work group size of 32 threads, $N_{block}$=256. Each workgroup would use 128 bytes of shared memory.
5. Primitive count scan pass 2: This is the same as the butterfly scan pass 2, except that there are eight values at once and eight work registers.
6. Primitive count scan pass 3: A pass that resolves the prefix sum and emits complete primitives. For improved throughput on load-store as well as arithmetic operations, four primitives per thread are operated on again.

7.

(It should be noted here that working on multiple primitives per thread is advantageous as it facilitates potentially obtaining better load-store throughput when writing out indices. The Applicants have recognised that by far the most common case for strips with primitive restarts is that the restarts are sparsely placed in memory, such that in the most common case, there will be plural (e.g. four) primitives which should all emit indices to memory.)

In order to illustrate the above processes, an example prefix sum is now presented, where $N_{block}$ is 4, and the input set of indices is:

I=(5, 9, 1, 0, 5, 3, 2, 1, 4, 3, 2, 1, 9, 8, 8, 7)

First, I is split into blocks and a prefix sum is performed:

I'=($I_0$, $I_1$, $I_2$, $I_3$)
$I_0$=(0, 5, 14, 15)
$I_1$=(0, 5, 8, 10)
$I_2$=(0, 4, 7, 9)
$I_3$=(0, 9, 17, 25)

with residuals $R_0$=(15, 11, 10, 32)

Then a prefix sum is performed on $R_0$ to obtain $R'_0$=(0, 15, 26, 36)

with residual $R_1$=68.

Since $R_1$ has a single element, the total sum of the array is now known.

The final prefix sum is obtained by combining $R'_0$ results with I.

$$I_{scan}(n)=I'(n)+R'_0(\lfloor n/N_{block}\rfloor) \quad (7)$$

A postfix sum is very similar, except that instead of (7), the following function is used:

$$I_{scan}(n)=I'(n)+R'_0(\lfloor n/N_{block}-1\rfloor) \quad (8)$$

A worked example illustrating an embodiment of the index reordering process that is performed at the index reordering stages 43 and 46, will now also be given. In this case, it is assumed that the input set of indices defines triangular primitives in the form of triangle strips, and that the first index position in the input set of indices is index position "0".

An example of such an input set of indices, with 16 indices, can be given as follows, where X denotes a primitive restart (i.e. the end of a triangle strip):

(2, 5, 4, X, 6, X, 7, 9, 0, 3, X, 1, 4, 11, 12, 14)

As in this case, the primitives are provided in the form of triangle strips, the desired set of indices, i.e. with no primitive restarts, would look like this:

(2, 5, 4) (7, 9, 0) (0, 9, 3) (1, 4, 11) (11, 4, 12) (11, 12, 14)

As can be seen, for the triangles in odd positions in the set after a primitive restart, the winding order for the first two indices defining each primitive is swapped. The presence of a primitive restart, restarts the even/odd counter (i.e. start again from even after a primitive restart).

In order to obtain the desired set of indices from the original set of indices, the first step is to determine the start and end positions of each triangle strip in the set of indices.

In order to do this, as discussed above, the input set of indices is first divided into blocks, with each block (in this case) containing four indices (i.e. $N_{block}$=4).

The first block is therefore: (2, 5, 4, X).

$I_{start}$ and $I_{end}$ are then calculated for this block, in parallel, using equations (5) and (3) above. This gives:

$I_{start}$: (0, 0, 0, 4)
$I_{end}$: (16, 16, 16, 3)

$I_{start}$ and $I_{end}$ are then propagated forwards and backwards, respectively, within the block with "max" and "min" scans as discussed above. This is shown in FIG. 9.

Figure 9:
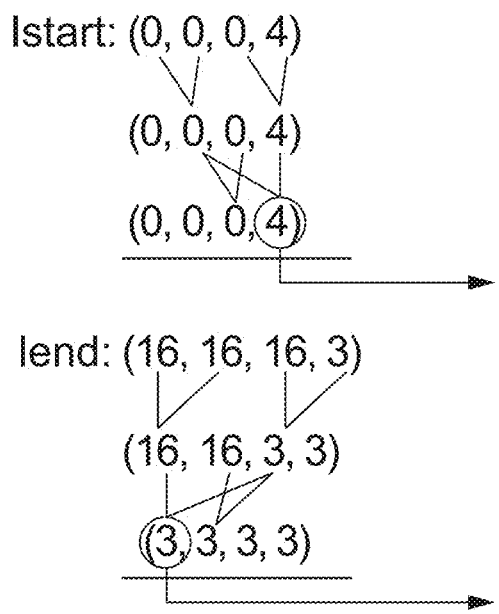
FIGS. 9, 10, 11 and 12 show the reordering of an example set of indices in an embodiment of the technology described herein.

The block residuals, which are circled in FIG. 9, are also extracted: (4, 3).

The same process is performed in parallel for the other three blocks:

(6, X, 7, 9)
(0, 3, X, 1)
(4, 11, 12, 4)

The residuals of these blocks will be:

(6, 5)
(11, 10)
(0, 16)

respectively.

Figure 10:
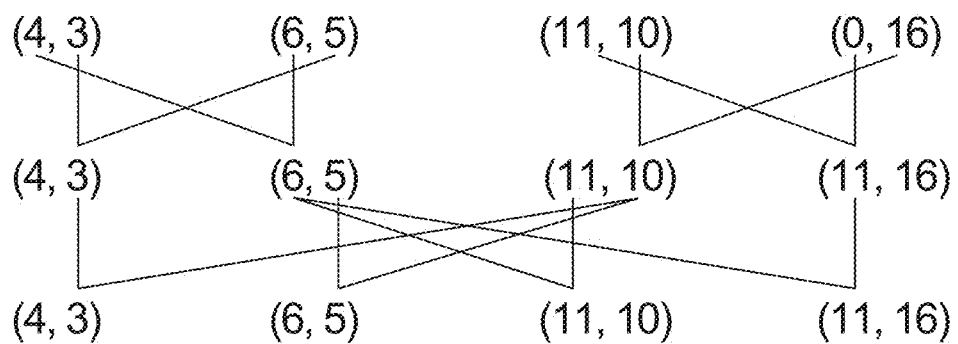

The block residuals are then propagated forwards and backwards, as shown in FIG. 10.

Figure 11:
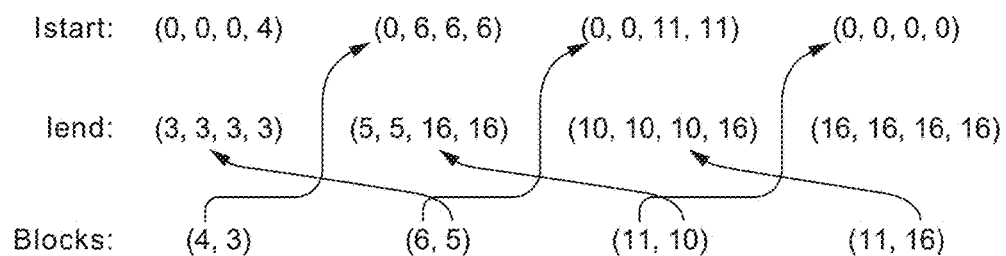

The results of this are then merged with the four blocks, as shown in FIG. 11. This gives the following final results:

$I_{start}$=(0, 0, 0, 4) (4, 6, 6, 6) (6, 6, 11, 11) (11, 11, 11, 11)
$I_{end}$=(3, 3, 3, 3) (5, 5, 10, 10) (10, 10, 10, 16) (16, 16, 16, 16)

The next step is to determine for each index position whether a triangular primitive is being emitted, using the triangle strip rule: $n+3 \leq E(n)$. If this holds, then this means that a triangle is to be emitted (written out for the index position in question (i.e. that the index position in question is the start of a complete primitive).

If it is a triangle, a prefix sum (equation (6)) is performed in order to determine the position to which the triangle's indices should be emitted in the new (reordered) set of indices, which in this example gives:

(0, 1, 1, 1) (1, 1, 1, 2) (3, 3, 3, 3) (4, 5, 6, 6).

In order to determine the winding order for the output primitive, the following expression is checked:

$$n-S(n) \bmod 2$$

If this expression is odd, then the winding order is swapped.

Figure 12:
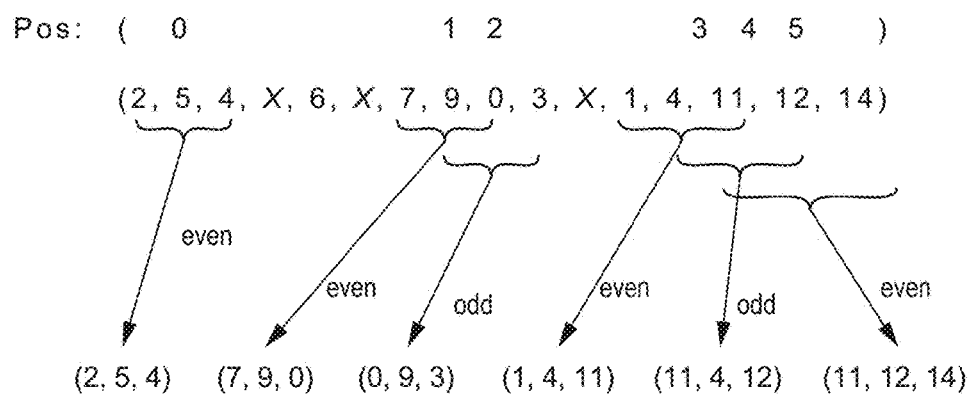

The final step is then to read the input set of indices and emit the reordered set of indices (which corresponds to the desired set of indices given above), as shown in FIG. 12. (Again the first primitive in the sequence has position "0".)

Figure 13:
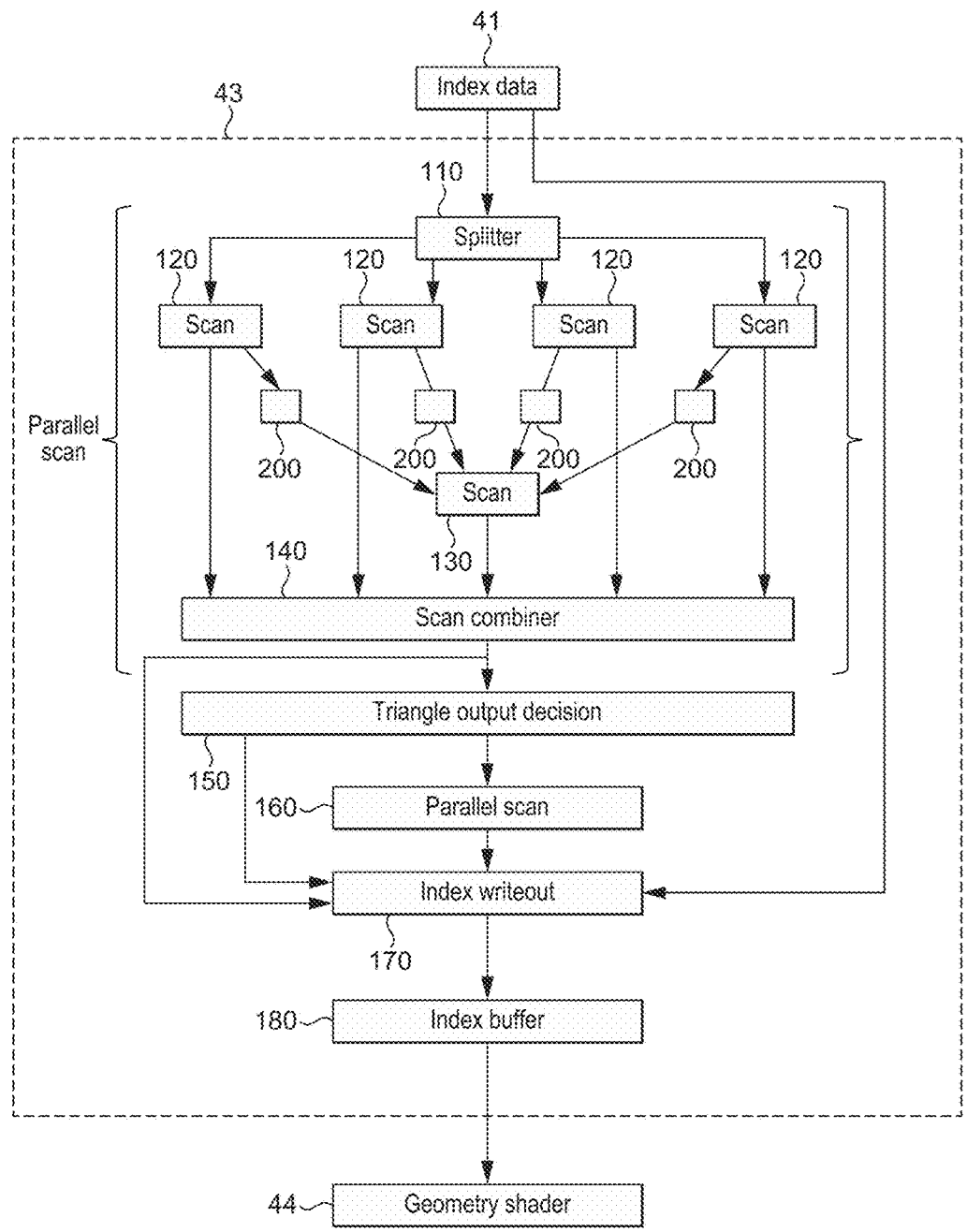
FIG. 13 is a schematic diagram of an embodiment of the technology described herein.

FIG. 13 is a schematic diagram showing the index reordering stages 43 and 46 in more detail.

As shown in FIG. 13, an input set of indices 41, which contains primitive restarts, is input into splitter stage 110, where it is split into blocks of index positions.

Each of these blocks is then scanned by a scanner stage 120, in parallel, to find $I_{start}$ and $I_{end}$ and then propagated forwards and backwards, respectively, with "max" and "min" scans (as illustrated in FIG. 9).

The residuals 200 from these scanner stages 120 are then combined and scanned at further scanner stage 130 (i.e. as illustrated in FIG. 10).

The results of the scanner stages 120 and 130 are then combined at a scan combiner stage 140, to produce an output identifying the start and end positions of the primitive strips in the input set of indices (as illustrated in FIG. 11).

The result of the scan combiner stage 140 is then tested, using the expression $n+3 \leq E(n)$, to determine when a triangular primitive should be output, at a triangle output decision stage 150. If a triangle is being written out then a further parallel scan is performed at parallel scan stage 160 to determine its position in the output set of indices.

If it is a triangle, the indices are then written out at index write-out stage 170 to an output set of indices 180, which contains no primitive restarts.

This set of indices 180 with no primitive restarts can then be input, e.g., into the geometry shader 44, for geometry shading. The further steps shown in FIG. 3 can then be performed.

Although the present embodiments have been described mainly in relation to triangular primitives, and triangle strips, it will be appreciated that the underlying concepts may be applied to any shape and arrangement of primitives.

It can be seen from the above that embodiments of the technology described herein can provide a more efficient mechanism for reordering a set of indices that may contain primitive restarts, to provide a reordered set of indices that contains only complete primitives and no primitive restarts. This is achieved in embodiments of the technology described herein by identifying the start and end positions of sequences of primitives in an input set of indices and then using those determined primitive sequence start and end positions to determine for index positions in the set of indices whether those index positions correspond to the start of a complete primitive or not. The process is such that it can be implemented in parallel, using efficient scanning operations.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a set of indices in a graphics processing system, the set of indices comprising a sequence of indices indexing a set of vertices to identify vertices to be used to form graphics primitives to be processed, and containing at least one primitive restart indicating a start of a sequence of primitives in the set of indices, each index in the set of indices having a respective index position in the set of indices, each index position being part of a sequence of primitives in the set of indices;

the method comprising:
  determining, for each index position in the set of indices, an index position of an end of the sequence of primitives that the index position is part of by:
    assigning an initial value to each index position in the set of indices based on whether the index position corresponds to a primitive restart or not; and then
    propagating the values initially assigned to the index positions to other index positions in the set of indices by performing a prefix scan using a minimum operator in a direction from the end of the set of indices towards the start of the set of indices;
  the method further comprising, for each index position in the set of indices:
    using the respective determined index position of the end of the sequence of primitives that the index position is part of to determine whether the index position corresponds to a start of a complete primitive in the set of indices.

2. The method of claim 1, wherein, for an index position in the set of indices: the respective index position of the end of the sequence of primitives that the index position is part of is determined as being the index position of the first primitive restart in the set of indices at or after the index position, or as an end index position in the set of indices, where there are no primitive restarts between the index position and the end of the set of indices.

3. The method of claim 1, further comprising:
determining, for each index position in the set of indices, an index position of a start of the sequence of primitives that the index position is part of.

4. The method of claim 3, wherein for an index position in the set of indices:
the respective index position of the start of the sequence of primitives that the index position is part of is determined as being the next index position immediately after the last primitive restart before the index position, or the start of the set of indices where there are no primitive restarts between the start of the set of indices and the index position.

5. The method of claim 3, wherein the respective index position of the start of the sequence of primitives that the index position is part of is determined for each position in the set of indices by:
assigning an initial value to each index position in the set of indices based on whether the index position corresponds to a primitive restart or not; and then
propagating the values initially assigned to the index positions to other index positions in the set of indices by performing a prefix scan using a maximum operator in a direction from the start of the set of indices towards the end of the set of indices.

6. The method of claim 3, further comprising also using the determined last primitive restart position before an index position to determine whether the index position corresponds to the start of a complete primitive in the set of indices.

7. The method of claim 1, wherein for an index position in the set of indices:
the respective determined index position of the end of the sequence of primitives that the index position is part of is used to determine whether the index position corresponds to the start of a complete primitive in the set of indices by:
treating the index position as if it is the first index in a candidate primitive in the set of indices which will comprise the index position and a set of consecutive following indices in the set of indices; and
determining whether any of the index positions in the set of index positions for the candidate primitive correspond to a primitive restart or not.

8. The method of claim 1, further comprising:
when it is determined that an index position is the start of a complete primitive, determining the winding order for that complete primitive.

9. The method of claim 1, further comprising:
when it is determined that an index position is the start of a complete primitive, determining the position of that complete primitive in the sequence of primitives, comprising determining the position in the sequence of primitives for an identified complete primitive using a prefix sum to determine the number of complete primitives in the set of indices up to that complete primitive.

10. The method of claim 1, comprising:
dividing the set of indices to be processed into two or more blocks of index positions;
scanning the blocks of index positions individually, and in parallel, to determine for each index position in a block, the respective index position of the end of the sequence of primitives in the block that the index position is part of or the respective index position of the start of the sequence of primitives in the block that the index position is part of; and
propagating the primitive sequence end or start index positions for respective blocks to other blocks that the input set of indices has been divided into, by producing a residual value for each block, performing a scan of the residual values from the blocks, and combining the results of the scan of the block residual values with the results of the scans of each block, to thereby determine for each index position in the set of indices, the respective index position of the end of the sequence of primitives in the set of indices that the index position is part of or the respective index position of the start of the sequence of primitives in the set of indices that the index position is part of, wherein each block of index positions is further subdivided into plural smaller blocks of index positions each of which are processed by a respective single execution thread using registers.

11. The method of claim 1, further comprising:
writing out a modified version of the input set of indices that comprises all of the primitives defined in the input set of indices as complete primitives, and that does not contain any primitive restarts; and
using the modified version of the set of indices that contains only complete primitives to process the primitives defined by the input set of indices.

12. An apparatus for processing a set of indices in a graphics processing system, the apparatus comprising:
processing circuitry operable to, for each index position in a set of indices that comprises a sequence of indices indexing a set of vertices to identify vertices to be used to form graphics primitives to be processed, and contains at least one primitive restart indicating a start of a sequence of primitives in the set of indices, each index in the set of indices having a respective index position in the set of indices, each index position being part of a sequence of primitives in the set of indices, determine an index position of an end of the sequence of primitives that the index position is part of by:
assigning an initial value to each index position in the set of indices based on whether the index position corresponds to a primitive restart or not; and then
propagating the values initially assigned to the index positions to other index positions in the set of indices by performing a prefix scan using a minimum operator in a direction from the end of the set of indices towards the start of the set of indices;
the apparatus further comprising:
further processing circuitry operable to, for each index position in the set of indices, use the respective determined index position of the end of the sequence of primitives that the index position is part of to determine whether the index position corresponds to a start of a complete primitive in the set of indices.

13. The apparatus of claim 12, wherein, for an index position in the set of indices: the respective index position of the end of the sequence of primitives that the index position is part of is determined as being the index position of the first primitive restart in the set of indices at or after the index position, or as an end index position in the set of indices, where there are no primitive restarts between the index position and the end of the set of indices.

14. The apparatus of claim 12, wherein the processing circuitry is further configured to:
   determine, for each index position in the set of indices, an index position of a start of the sequence of primitives that the index position is part of.

15. The apparatus of claim 14, wherein for an index position in the set of indices:
   the respective index position of the start of the sequence of primitives that the index position is part of is determined as being the next index position immediately after the last primitive restart before the index position, or the start of the set of indices where there are no primitive restarts between the start of the set of indices and the index position.

16. The apparatus of claim 14, wherein the respective index position of the start of the sequence of primitives that the index position is part of is determined for each position in the set of indices by:
   assigning an initial value to each index position in the set of indices based on whether the index position corresponds to a primitive restart or not; and then
   propagating the values initially assigned to the index positions to other index positions in the set of indices by performing a prefix scan using a maximum operator in a direction from the start of the set of indices towards the end of the set of indices.

17. The apparatus of claim 14, wherein the further processing circuitry is further configured to:
   also use the determined last primitive restart position before an index position to determine whether the index position corresponds to the start of a complete primitive in the set of indices.

18. A non-transitory computer readable storage medium storing computer software code which when executing on a data processor performs a method of processing a set of indices in a graphics processing system, the set of indices comprising a sequence of indices indexing a set of vertices to identify vertices to be used to form graphics primitives to be processed, and containing at least one primitive restart indicating a start of a sequence of primitives in the set of indices, each index in the set of indices having a respective index position in the set of indices, each index position being part of a sequence of primitives in the set of indices;
   the method comprising:
   determining, for each index position in the set of indices, an index position of an end of the sequence of primitives in the set of indices that the index position is part of by:
      assigning an initial value to each index position in the set of indices based on whether the index position corresponds to a primitive restart or not; and then
      propagating the values initially assigned to the index positions to other index positions in the set of indices by performing a prefix scan using a minimum operator in a direction from the end of the set of indices towards the start of the set of indices;
   the method further comprising, for each index position in the set of indices:
   using the respective determined index position of the end of the sequence of primitives that the index position is part of to determine whether the index position corresponds to a start of a complete primitive in the set of indices.

* * * * *